US006947860B2

(12) United States Patent
Frederick et al.

(10) Patent No.: US 6,947,860 B2
(45) Date of Patent: Sep. 20, 2005

(54) ELECTRONIC ARTICLE SURVEILLANCE SYSTEM STATIONARY TAG RESPONSE CANCELLER

(75) Inventors: Thomas J. Frederick, Coconut Creek, FL (US); Jeffrey T. Oakes, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 155 days.

(21) Appl. No.: 10/216,577

(22) Filed: Aug. 9, 2002

(65) Prior Publication Data

US 2004/0036606 A1 Feb. 26, 2004

(51) Int. Cl.[7] .................................................. H04Q 5/22
(52) U.S. Cl. ......................... 702/72; 702/122; 340/10.1
(58) Field of Search ................................ 702/721, 122; 340/10.1, 572.1, 572.2, 572.3, 572.4, 572.5; 327/34; 455/296

(56) References Cited

U.S. PATENT DOCUMENTS 3,810,147 A * 5/1974 Lichtblau ................. 340/572.3
3,863,244 A * 1/1975 Lichtblau ................. 340/572.3
4,168,496 A * 9/1979 Lichtblau ................. 340/572.4
4,215,342 A * 7/1980 Horowitz ................. 340/572.4
4,247,944 A * 1/1981 Sifford ....................... 375/340
4,510,489 A 4/1985 Anderson et al. ........... 340/572
5,847,680 A * 12/1998 McBurney ............. 342/357.04
6,151,689 A * 11/2000 Garcia et al. ................. 714/49
6,353,406 B1 * 3/2002 Lanzl et al. ................ 342/118
2003/0102960 A1 * 6/2003 Beigel et al. .............. 340/10.1

* cited by examiner

*Primary Examiner*—Marc S. Hoff
*Assistant Examiner*—Carol Tsai

(57) ABSTRACT

A ringdown canceller is provided for electronic article surveillance (EAS) tag response processing, which uses two adaptive replica signals and compares the replica signal phase to the receive signal phase to determine if there is a stationary EAS tag in the interrogation or detection zone. The adaptive replica buffers allow the system to adjust to changing ambient conditions, and adjust rapidly to an EAS tag that suddenly appears in the detection zone and becomes stationary, or to a stationary EAS tag that suddenly leaves the detection zone. The ringdown response of the transmitter circuit is constant, just like a stationary tag, and is removed from the receive signal in the same manner as a stationary tag.

22 Claims, 2 Drawing Sheets

ELECTRONIC ARTICLE SURVEILLANCE SYSTEM STATIONARY TAG RESPONSE CANCELLER

CROSS REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention relates to the processing of electronic article surveillance (EAS) tag responses, and more particularly to a system and method of processing that removes stationary EAS tag responses signals from EAS tag detection.

2. Description of the Related Art

An acoustomagnetic or magnetomechanical EAS system interrogates an EAS tag by transmitting an electromagnetic burst at a resonance frequency of the tag. The tag responds with an acoustomagnetic or magnetomechanical response frequency that is detectable by the EAS system receiver. At the end of the transmitter burst, the system detects the exponentially decaying response of the tag. The tag signal amplitude rapidly decays to ambient noise levels, so the time interval in which the tag signal can be detected is limited. U.S. Pat. No. 4,510,489 discloses such an EAS system, one embodiment of which is sold under the trademark ULTRA-MAX by Sensormatic Electronics Corporation, Boca Raton, Fla.

In the above-described process, the transmitter burst signal does not end abruptly but instead decays exponentially because of transmitter circuit reactance. The tag signal cannot be detected until this circuit "ringdown" has essentially disappeared. Therefore, the time period during which the tag signal can be detected is reduced. This is a particular problem because the circuit ringdown occurs while the tag signal is at its largest. An additional detection problem occurs when a tag is stationary in the fringe of the detection zone. As the ambient noise varies during the day, a tag that is far enough away from the receiver to not be detected most of the day may be detected when the noise levels decrease below a certain level. This is a common problem in the retail environment where a display rack of tagged merchandise is located near a store entrance where the EAS detection or interrogation zone is located. It is desired that the system ignore the stationary item(s) and yet detect a tag moving through the detection zone.

Previous solutions for the circuit ringdown problem have been to hold detection until the ringdown signal is over, and by trying to control circuit reactance to minimize the ringdown effect. Waiting until the ringdown period is over sacrifices detection because the tag response signal is highest immediately after the transmit burst. Items placed near the antenna (such as display racks), which vary by location, affect circuit reactance and make the circuit reactance difficult to control. In addition, transmitter power amplifier design relies on the circuit Q being fairly high, which limits how low the reactance can be adjusted.

A previous attempt at a solution to the stationary tag problem, which was relatively unsuccessful, involved storing the time domain tag response signal in a memory buffer, which is replica of the tag signal, and subtracting the replica signal from the received tag signal before attempting tag detection. However, the system needed to be able to detect that the tag signal is not moving before it adds the signal to the replica. In addition, it needed to be able to detect when the tag had been removed, otherwise the subtraction of the replica signal from the input resulted in an "anti-replica" which caused a system alarm that continues until the system stops subtracting the replica.

BRIEF SUMMARY OF THE INVENTION

The solution to the ringdown detection problem, called a ringdown canceller as provided herein uses two adaptive replica signals and compares the replica signal phase to the receive signal phase to determine if there is a stationary tag in the detection zone. The adaptive replica buffers allow the system to adjust to changing ambient conditions, and adjust rapidly to a tag that suddenly appears in the detection zone and becomes stationary, or to a stationary tag that suddenly leaves the detection zone. The ringdown response of the transmitter circuit is constant, just like a stationary tag, and is removed from the receive signal in the same manner as a stationary tag.

The system and method removes undesirable decaying response signals from a receive signal for electronic article surveillance tag detection, and includes the following. Obtaining a first replica signal of a portion of the receive signal by gradually adapting the first replica signal to the characteristics of the selected portion of receive signal. Subtracting the first replica signal from the receive signal. Obtaining a second replica signal of the selected portion of the receive signal by quickly adapting the second replica signal to the characteristics of the selected portion. The phase of the second replica signal is compared to the phase of the received signal minus the first replica signal to determine a phase difference. If the phase difference becomes nearly constant for a first preselected period of time, and if the amplitude of the receive signal is greater than a threshold noise value, then the first replica signal is made to adapt quickly to the characteristics of the selected portion of the receive signal. After a second preselected period of time, the first replica signal will again have gradually adapted to the characteristics of the selected portion of the receive signal, thus tracking slow environmental changes.

Objectives, advantages, and applications of the present invention will be made apparent by the following detailed description of embodiments of the invention.

DETAILED DESCRIPTION OF THE INVENTION

The present system monitors the tag window, which is a processing period that occurs after the transmit burst, and the noise average window, which is a processing period occurs before the next transmitter burst. The system processor attempts to learn which signals in the tag window are undesirable and remove the undesirable signals from the receive signal before detection. To accomplish this, the processor retains two replica signals; a fast replica and a slow replica. In normal operation, the slow replica gradually adapts and obtains the characteristics of the portion of the receive signal that is nearly constant and subtracts it from the receive signal. Slow environmental changes are therefore tracked. A moving tag, which is characterized by rapidly changing phase and magnitude, is not captured by the slow replica and therefore is not subtracted from the receive signal. The slow replica also has the provision to update quickly on command of the processor.

The fast replica is similar to the slow replica but it quickly adopts the characteristics of the nearly constant portion of the receive signal. The phase of the fast replica is calculated and compared to that of the receive signal minus the slow replica. If the difference in phase of the fast replica and the receive signal becomes nearly constant for a long enough period, there must be a stationary tag in the detection zone or a stationary tag must have been removed. Therefore, one of the criteria for quickly updating the slow replica is met. The other criterion is that during the same time period the amplitude of the raw input signal must be greater than the threshold calculated in the noise average window. When these criteria are satisfied, the coefficients of the slow replica filter are changed to allow the slow replica to update quickly. After a brief period, the coefficients change back to the slow value and normal operation resumes.

The ringdown response of the transmitter circuit is constant, just like a stationary tag, and is removed from the receive signal in the same fashion as a stationary tag. A change in the circuit reactance due to a change in the environment will cause the slow replica buffer to update in the same fashion as a tag entering the detection zone and becoming stationary.

The processing of the tag window data with the replicas can be performed before or after the data is mixed down to baseband frequencies. Indeed, doing the processing after down converting offers advantages of decreased real time and memory demands. For reasons of clarity, the detailed description below describes a system that processes the data before down converting.

Figure 1A:
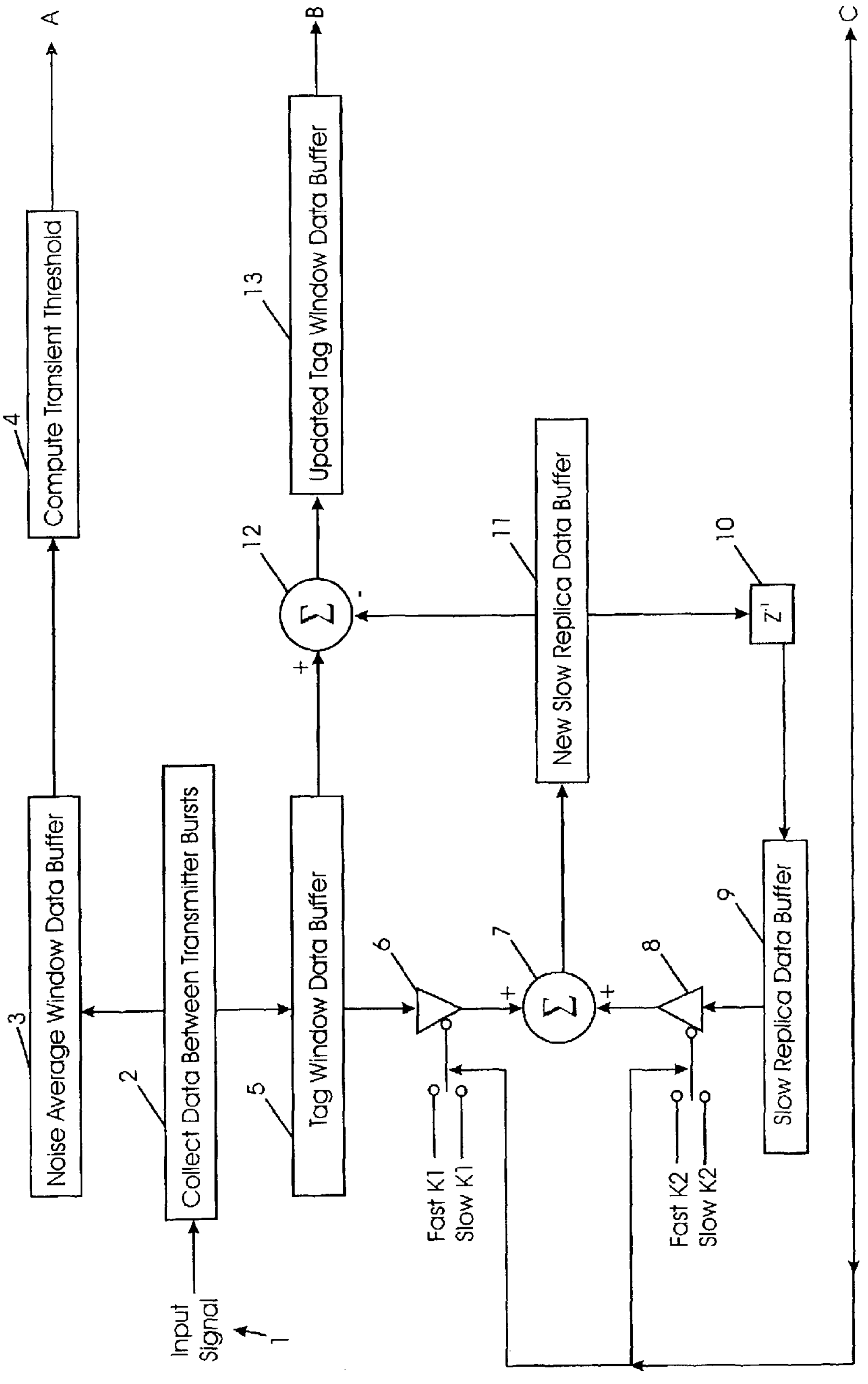
FIGS. 1A and 1B together are a block diagram of the present invention.
Figure 1B:
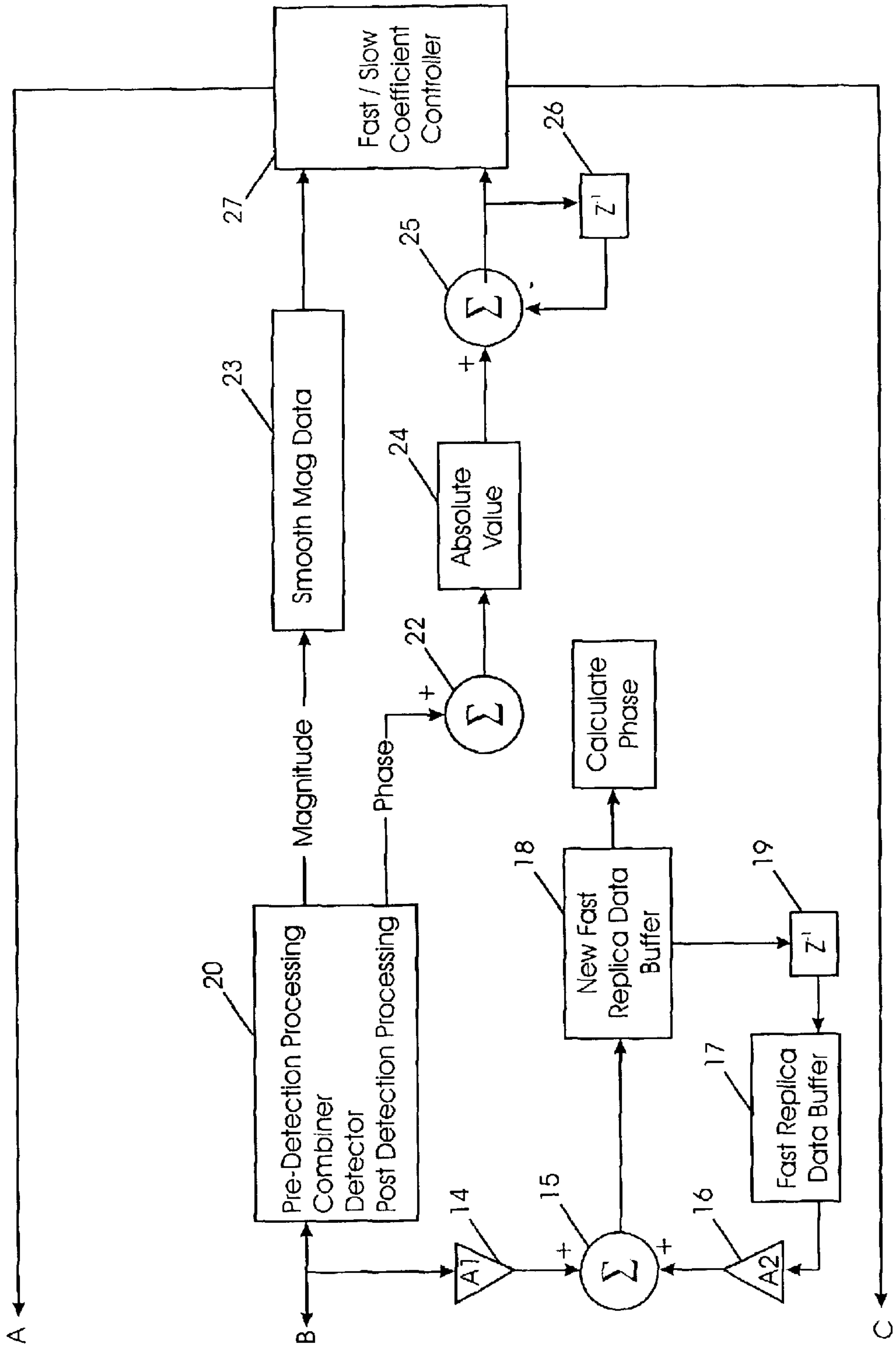

Referring to FIGS. 1A and 1B, the input signal (1) is collected in a receive buffer (2) and is separated into tag window data (5) and noise average window data (3). The noise average window, where no signals coherent to the transmitter can appear, is used to calculate the ambient noise level. This noise level is used to establish a transient noise threshold (4) later used by the processor as criteria for adjusting the slow replica buffer.

Before any processing is performed on the tag window data (5), the data is multiplied by a coefficient K1 (6) and added (7) to the slow replica buffer (9), which is multiplied by coefficient K2 (8). During normal operation, the coefficients K1 and K2 (6 and 8, respectively) are set to the "slow" values for gradual replica adaptation. The result of this operation is designated as the new slow replica buffer (11). The new slow replica buffer (11) is then subtracted (12) from the tag window data buffer (5) to make the updated tag window data buffer (13). After the delay (10), the new slow replica buffer (11) becomes the slow replica buffer (9). The updated tag window data buffer (13) is used by the system for tag detection (20) and for stationary tag determination. At this point, under normal operation the updated tag window data buffer (13) should contain no tag signal or a tag signal from a moving tag. A new stationary tag signal could be present, however, and the processing of the fast replica should uncover it.

In an arrangement similar to the slow replica buffer processing, the updated tag window data buffer (13) is multiplied by a coefficient A1 and added (15) to the fast replica buffer (17), and multiplied by coefficient A2 (16). Unlike the 'K' coefficients, the 'A' coefficients are fixed and are selected so that the new fast replica buffer (18) quickly tracks the updated tag window data buffer (13). The fast replica buffer undergoes the same phase calculation (21) that the updated tag window data undergoes in the detector (20). The phase values from the detector (20) and the new fast replica data buffer (18) are compared (22), and the absolute value (24) of the difference in phases are tracked. If the phase difference between these signals becomes nearly constant, which will happen if both replicas should contain a stationary tag, the difference (25) between successive measurements (26) will become small. This difference (25) is fed to the FAST/SLOW coefficient controller (27) and is one of the criteria used to determine if the slow replica buffer coefficients K1 and K2 (6 and 8, respectively) should be set to fast for quick replica adaptation.

The FAST/SLOW coefficient controller (27) also compares the detector signal magnitude (23) to the transient noise threshold (4) calculated earlier. If the detector signal magnitude (23) is greater than the threshold (4), and the phase difference (25) between successive measurements is small, then both of the criteria used by the FAST/SLOW coefficient controller (27) are met. If the FAST/SLOW coefficient controller (27) determines that a stationary tag has come into the detection zone, it will change the slow replica buffer coefficients K1 and K2, to their fast values for a predetermined period of time. Thus the stationary tag signal will be quickly added to the slow replica buffer. A stationary tag that disappears will also satisfy the same criteria and will rapidly be removed from the slow replica buffer. Once the time selected for the coefficients to be fast has expired, they will revert back to the slow values.

It is to be understood that variations and modifications of the present invention can be made without departing from the scope of the invention. It is also to be understood that the scope of the invention is not to be interpreted as limited to the specific embodiments disclosed herein, but only in accordance with the appended claims when read in light of the forgoing disclosure.

What is claimed is:

1. A method to remove undesirable decaying response signals from a receive signal for electronic article surveillance tag detection, comprising:

obtaining a first replica signal of a selected portion of the receive signal by gradually adapting said first replica signal to the characteristics of the selected portion of the receive signal;

subtracting said first replica signal from said receive signal;

obtaining a second replica signal of the selected portion of the receive signal by quickly adapting said second replica signal to the characteristics of the selected portion of the receive signal;

comparing the phase of the second replica signal to the phase of the receive signal minus the first replica signal to determine a phase difference; if the phase difference becomes nearly constant for a first preselected period of time and during the first preselected period of time the amplitude of said receive signal is greater than a threshold noise value, then the first replica signal adapts quickly to the characteristics of the selected portion of said receive signal; and, after a second preselected period of time the first replica signal again adapts gradually to the characteristics of the selected portion of said receive signal.

2. The method of claim 1 wherein obtaining said first replica signal comprises:

separating said receive signal into a tag window data and a noise window data;

multiplying said tag window data by a coefficient K1 and adding to the product of a slow replica buffer and a coefficient K2, the sum being said first replica signal, and wherein said coefficients K1 and K2 are selected to correspond to slow adaptation values; and, storing in said slow replica buffer a delayed version of said first replica signal.

3. The method of claim 2 wherein subtracting said first replica signal from said receive signal comprises:

subtracting said first replica signal from said tag window data to produce an updated tag window data.

4. The method of claim 3 wherein obtaining said second replica signal comprises:

multiplying said updated tag window data by a coefficient A1 and adding to the product of a fast replica buffer and a coefficient A2, the sum being the second replica signal, and wherein said coefficients A1 and A2 are preselected to correspond to fast adaptation values; and, storing in said first replica buffer a delayed version of said second replica signal.

5. The method of claim 4 wherein comparing the phase of the second replica signal to the phase of the receive signal minus the first replica signal comprises:

calculating the phase of said updated tag window data;

calculating the phase of said second replica signal; and, subtracting the phase of the second replica signal from the phase of the updated tag window data to determine said phase difference.

6. The method of claim 5 further comprising:

calculating a noise threshold level from said noise window data;

comparing a magnitude of said updated tag window data to said nose threshold level;

monitoring successive measurements of said phase difference; and, if successive measurements of said phase difference become nearly constant and the magnitude of said updated tag window data is greater than said noise threshold level, then, selecting coefficients K1 and K2 to correspond to fast adaptation values for a preselected period of time.

7. A system to remove undesirable decaying response signals from a receive signal for electronic article surveillance tag detection, comprising:

means for obtaining a first replica signal of a selected portion of the receive signal by gradually adapting said first replica signal to the characteristics of the selected portion of the receive signal;

means for subtracting said first replica signal from said receive signal;

means for obtaining a second replica signal of the selected portion of the receive signal by quickly adapting said second replica signal to the characteristics of the selected portion of the receive signal;

means for comparing the phase of the second replica signal to the phase of the receive signal minus the first replica signal to determine a phase difference; means for determining if the phase difference becomes nearly constant for a first preselected period of time and during the first preselected period of time the amplitude of said receive signal is greater than a threshold noise value, then means for causing the first replica signal to adapt quickly to the characteristics of the selected portion of said receive signal; and, after a second preselected period of time, means for causing the first replica signal to again adapt gradually to the characteristics of the selected portion of said receive signal.

8. The system of claim 7 wherein said means for obtaining said first replica signal comprises:

means for separating said receive signal into a tag window data and a noise window data;

means for multiplying said tag window data by a coefficient K1 and adding to the product of a slow replica buffer and a coefficient K2, the sum being said first replica signal, and wherein said coefficients K1 and K2 are selected to correspond to slow adaptation values; and, means for storing in said slow replica buffer a delayed version of said first replica signal.

9. The system of claim 8 wherein said means for subtracting said first replica signal from said receive signal comprises:

means for subtracting said first replica signal from said tag window data to produce an updated tag window data.

10. The system of claim 9 wherein said means for obtaining said second replica signal comprises:

means for multiplying said updated tag window data by a coefficient A1 and adding to the product of a fast replica buffer and a coefficient A2 the sum being the second replica signal, and wherein said coefficients A1 and A2 are preselected to correspond to fast adaptation values; and, means for storing in said fast replica buffer a delayed version of said second replica signal.

11. The system of claim 10 wherein said means for comparing the phase of the second replica signal to the phase of the receive signal minus the first replica signal comprises:

means for calculating the phase of said updated tag window data;

means for calculating the phase of said second replica signal; and, means for subtracting the phase of the second replica signal from the phase of the updated tag window data to determine said phase difference.

12. The system of claim 11 further comprising:

means for calculating a noise threshold level from said noise window data;

means for comparing a magnitude of said updated tag window data to said nose threshold level;

means for monitoring successive measurements of said phase difference; and, means for determining if successive measurements of said phase difference become nearly constant and the magnitude of said updated tag window data is greater than said noise threshold level, then, means for selecting coefficients K1 and K2 to correspond to fast adaptation values for a preselected period of time.

13. A method to remove undesirable decaying response signals from a receive signal for electronic article surveillance tag detection, comprising:

obtaining a first replica signal of a selected portion of the receive signal by gradually adapting said first replica signal to the characteristics of the selected portion of the receive signal;

subtracting said first replica signal from said receive signal;

obtaining a second replica signal of the selected portion of the receive signal by quickly adapting said second replica signal to the characteristics of the selected portion of the receive signal;

comparing the phase of the second replica signal to the phase of the receive signal minus the first replica signal to determine a phase difference; if the phase difference becomes nearly constant for a first preselected period of time and during the first preselected period of time the amplitude of said receive signal is greater than a threshold noise value, then the first replica signal adapts quickly to the characteristics of the selected portion of said receive signal; and, after a second preselected period of time the first replica signal again adapts gradually to the characteristics of the selected portion of said receive signal;

wherein obtaining said first replica signal comprises:

separating said receive signal into a tag window data and a noise window data;

multiplying said tag window data by a coefficient K1 and adding to the product of a slow replica buffer and a coefficient K2, the sum being said first replica signal, and wherein said coefficients K1 and K2 are selected to correspond to slow adaptation values; and, storing in said slow replica buffer a delayed version of said first replica signal.

14. The method of claim 13 wherein subtracting said first replica signal from said receive signal comprises:

subtracting said first replica signal from said tag window data to produce an updated tag window data.

15. The method of claim 14 wherein obtaining said second replica signal comprises:

multiplying said updated tag window data by a coefficient A1 and adding to the product of a fast replica buffer and a coefficient A2, the sum being the second replica signal, and wherein said coefficients A1 and A2 are preselected to correspond to fast adaptation values; and, storing in said fast replica buffer a delayed version of said second replica signal.

16. The method of claim 15 wherein comparing the phase of the second replica signal to the phase of the receive signal minus the first replica signal comprises:

calculating the phase of said updated tag window data;

calculating the phase of said second replica signal; and, subtracting the phase of the second replica signal from the phase of the updated tag window data to determine said phase difference.

17. The method of claim 16 further comprising:

calculating a noise threshold level from said noise window data;

comparing a magnitude of said updated tag window data to said nose threshold level;

monitoring successive measurements of said phase difference; and, if successive measurements of said phase difference become nearly constant and the magnitude of said updated tag window data is greater than said noise threshold level, then, selecting coefficients K1 and K2 to correspond to fast adaptation values for a preselected period of time.

18. A system to remove undesirable decaying response signals from a receive signal for electronic article surveillance tag detection, comprising:

means for obtaining a first replica signal of a selected portion of the receive signal by gradually adapting said first replica signal to the characteristics of the selected portion of the receive signal;

means for subtracting said first replica signal from said receive signal;

means for obtaining a second replica signal of the selected portion of the receive signal by quickly adapting said second replica signal to the characteristics of the selected portion of the receive signal;

means for comparing the phase of the second replica signal to the phase of the receive signal minus the first replica signal to determine a phase difference; means for determining if the phase difference becomes nearly constant for a first preselected period of time and during the first preselected period of time the amplitude of said receive signal is greater than a threshold noise value, then means for causing the first replica signal to adapt quickly to the characteristics of the selected portion of said receive signal; and, after a second preselected period of time, means for causing the first replica signal to again adapt gradually to the characteristics of the selected portion of said receive signal;

wherein said means for obtaining said first replica signal comprises:

means for separating said receive signal into a tag window data and a noise window data;

means for multiplying said tag window data by a coefficient K1 and adding to the product of a slow replica buffer and a coefficient K2, the sum being said first replica signal, and wherein said coefficients K1 and K2 are selected to correspond to slow adaptation values; and, means for storing in said slow replica buffer a delayed version of said first replica signal.

19. The system of claim 18 wherein said means for subtracting said first replica signal from said receive signal comprises:

means for subtracting said first replica signal from said tag window data to produce an updated tag window data.

20. The system of claim 19 wherein said means for obtaining said second replica signal comprises:

means for multiplying said updated tag window data by a coefficient A1 and adding to the product of a fast replica buffer and a coefficient A2, the sum being the second replica signal, and wherein said coefficients A1 and A2 are preselected to correspond to fast adaptation values; and, means for storing in said fast replica buffer a delayed version of said second replica signal.

21. The system of claim 20 wherein said means for comparing the phase of the second replica signal to the phase of the receive signal minus the first replica signal comprises:

means for calculating the phase of said updated tag window data;

means for calculating the phase of said second replica signal; and, means for subtracting the phase of the second replica signal from the phase of the updated tag window data to determine said phase difference.

22. The system of claim 11 further comprising:

means for calculating a noise threshold level from said noise window data;

means for comparing a magnitude of said updated tag window data to said nose threshold level;

means for monitoring successive measurements of said phase difference; and, means for determining if successive measurements of said phase difference become nearly constant and the magnitude of said updated tag window data is greater than said noise threshold level, then, means for selecting coefficients K1 and K2 to correspond to fast adaptation values for a preselected period of time.

* * * * *